United States Patent
Jeong et al.

[11] Patent Number: 5,822,480
[45] Date of Patent: Oct. 13, 1998

[54] NONLINEAR Y-JUNCTION WAVEGUIDE STRUCTURE

[75] Inventors: Jong-Sool Jeong; Seok-Ho Song, both of Daejeon, Rep. of Korea

[73] Assignee: Electronics and Telecommunications Research Institute, Daejeon, Rep. of Korea

[21] Appl. No.: 742,159

[22] Filed: Nov. 1, 1996

[30] Foreign Application Priority Data

Dec. 21, 1995 [KR] Rep. of Korea .................. 95-53660

[51] Int. Cl.⁶ .................. G02B 6/26; G02B 6/42
[52] U.S. Cl. .................. 385/45; 385/122; 385/16; 385/48
[58] Field of Search .................. 385/45, 122, 14, 385/15, 38, 46, 48, 131, 132, 16, 17, 18

[56] References Cited

U.S. PATENT DOCUMENTS 4,860,294  8/1989  Winzer et al. .................. 385/45 X
5,463,705  10/1995  Clauberg et al. .................. 385/45 X

OTHER PUBLICATIONS

The Nonlinear Coherent Coupler; Stephen M. Jensen; Oct. 1982; pp. 1580–1583.
Digital optical switch; Y. Silberberg, P. Perlmutter and J.E. Baran; Received 4 Jun. 1987; accepted for publication 24 Aug. 1987; pp. 1230–1232.
All-optical phase-and power-controlled switching in nonlinear waveguide junctions; Y. Silberberg and B.G. Sfez; Received Apr. 21, 1988; accepted Sep. 2, 1988; pp. 1132–1134.

Primary Examiner—Phan T. H. Palmer
Attorney, Agent, or Firm—Antonelli, Terry, Stout & Kraus, LLP

[57] ABSTRACT

A nonlinear Y-junction waveguide structure includes a straight linear waveguide, and a nonlinear waveguide partially joined to the linear waveguide and bent through a desired angle at an output end portion thereof, whereby incident light coming into the linear waveguide travels mainly along the linear waveguide when it has a power lower than a predetermined level while traveling mainly along the nonlinear waveguide when it has a power not lower than the predetermined level. The nonlinear Y-junction waveguide structure has an increased branching angle as compared to the conventional completely-operating optical device and exhibits an abrupt switching phenomenon. Accordingly, it is possible to achieve an easy adjustment of the critical power. In this regard, there is no difficulty in the fabrication of the waveguide structure.

2 Claims, 4 Drawing Sheets

NONLINEAR Y-JUNCTION WAVEGUIDE STRUCTURE

BACKGROUND OF THE INVENTION

1. Field of the Invention

The present invention relates to a nonlinear Y-junction waveguide structure having a large branching angle, and more particularly to a nonlinear Y-junction waveguide structure having a large branching angle for complete optical operation to achieve an efficient adjustment of nonlinear light passing through the waveguide so as to obtain an ultra-high complete light exchange and active optical path setting required to realize an ultra-high speed complete optical signal processing network.

2. Description of the Prior Art

Heretofore completely-operating optical devices are mainly classified into those of the nonlinear directional coupler (NLDC) type and those of the two mode interference (TMI) coupler type.

The first report relating to the NLDC structure was made by S. M. Jensen "The Nonlinear Coherent Coupler" IEEE, J. Quantum Electron., Vol. QE-18 pp1580–1583. High utility and applicability of such an NLDC structure having an ultra-high speed switching characteristic and a wide operating bandwidth have been proposed and evidenced. As a result, a great deal of research associated with the NLDC structure is being carried out.

On the other hand, the TMI coupler is so called "a zero gap nonlinear directional coupler". In the case of the TMI coupler, its optical paths are determined using an interference between a $TE_0$ mode and a $TE_1$ mode.

Such a TMI coupler exhibits a low critical power as compared to the NLDC. In particular, the output power of the TMI coupler has a digital characteristic. In this regard, intensive research associated with the TMI coupler is being carried out.

However, both the NLDC and TMI coupler have various problems to be solved.

For example, the NLDC is greatly affected by its optical waveguide structure. Furthermore, in the case of the NLDC, it is difficult to adjust the wavelength of incident light and the critical power. On the other hand, the TMI coupler has a small branching angle. Due to such a small branching angle, the TMI has a degradation in integration degree even when it is applied to optical devices of a large size.

Now, a linear directional coupler, which is a basis of such NLDC and TMI coupler type complete operating optical devices, will be described briefly.

Directional couplers are optical devices designed to enable incident light coming into the interior of an optical waveguide to travel along the optical waveguide while switching power with an adjacent optical waveguide. They are important devices which accomplish many useful functions in the integrated-optic field.

Such directional couplers may be designed to carry out many functions such as power division, modulation, switching, frequency selection and polarization selection.

These functions can be accomplished by applying an electric field to a selected one of optical waveguides defined in a directional coupler. In other words, directional couplers are a kind of electro-optic device which adjusts light in accordance with the intensity of an electric field exerted on an optical waveguide.

However, the method of adjusting light using an electric field has a limitation in terms of the driving speed of optical devices.

In order to overcome such a problem, extensive research has been done. Recently, it has been reported to the scientific world that a directional coupler having a Kerr medium or nonlinear medium exhibiting a Kerr effect interposed between its two optical waveguides can process optical signals at an ultra-high speed because it can be used as a complete operating optical device. In this regard, active research is being done.

The directional coupler using such a nonlinear medium is called "a nonlinear directional coupler".

However, such a nonlinear directional coupler exhibits a high critical power and is greatly affected by the wavelength of incident light and parameters of its structure. As a result, there is difficulty in fabrication. To overcome such drawbacks, a two mode interference coupler structure has also been proposed, and its development has been watched with keen interest. This two mode interference coupler has an advantage in that it exhibits a reduced influence by the parameters of its structure. However, it has a small branching angle resulting in a large size of the finally obtained optical device. As a result, there is a degradation in integration degree.

SUMMARY OF THE INVENTION

Therefore, an object of the invention is to provide a nonlinear Y-junction waveguide structure having a large branching angle for a complete optical operation, thereby overcoming the drawbacks involved in the conventional NLDC and TMI couplers.

In accordance with the present invention, this object can be accomplished through a nonlinear Y-junction waveguide structure comprising: a straight linear waveguide; and a nonlinear waveguide partially joined to the linear waveguide and bent to a desired angle at an output end portion thereof; whereby incident light coming into the linear waveguide travels mainly along the linear waveguide when it has a power lower than a predetermined level and traveling mainly along the nonlinear waveguide when it has a power equal to or greater than the predetermined level.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

Figure 1:
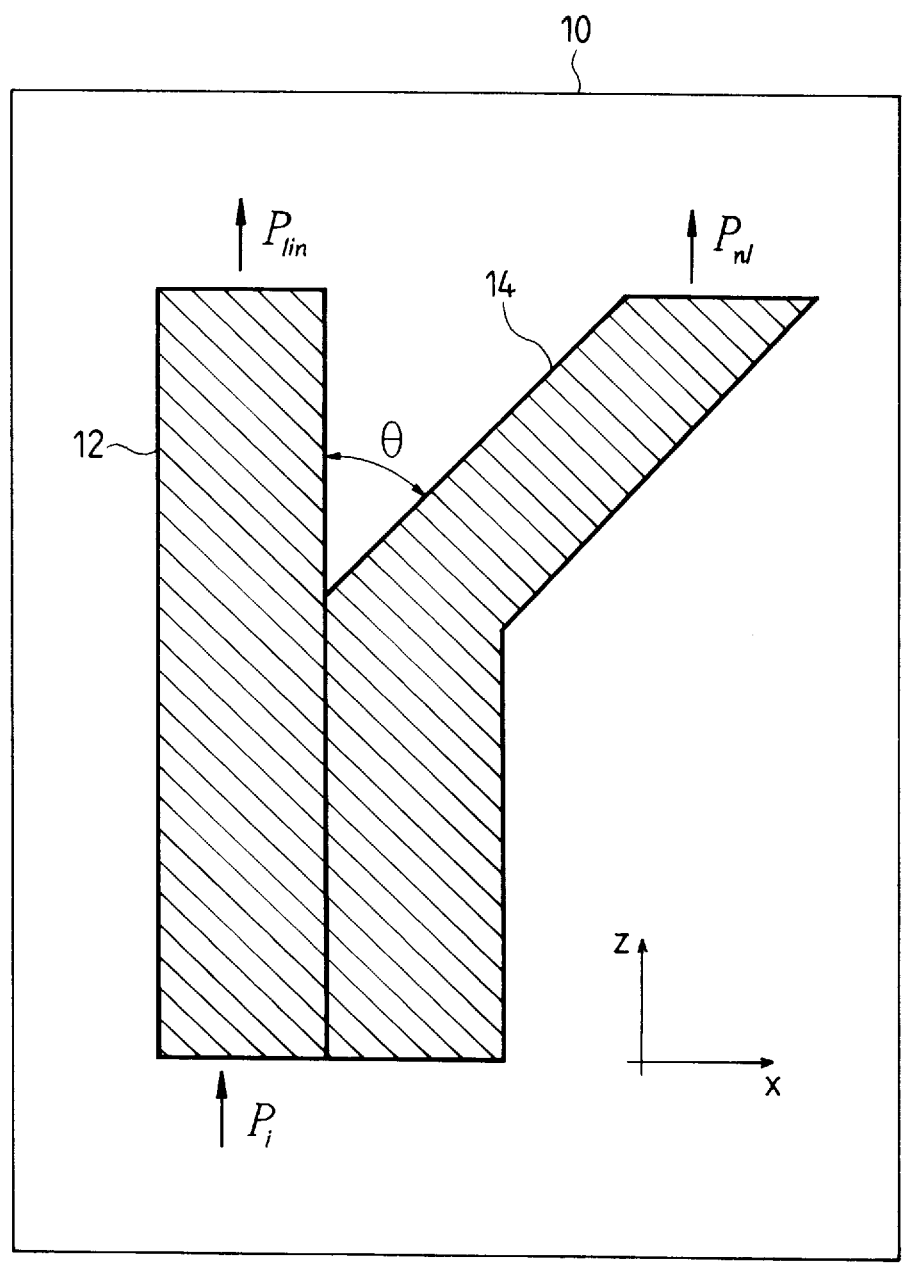
FIG. 1 is a schematic view illustrating a nonlinear Y-junction waveguide structure having a large branching angle in accordance with the present invention.

FIG. 1 is a schematic view illustrating a nonlinear Y-junction waveguide structure having a large branching angle in accordance with the present invention.

As shown in FIG. 1, the nonlinear Y-junction waveguide structure of the present invention includes a straight linear waveguide 12 and a nonlinear waveguide 14 partially joined to the linear waveguide and bent to a desired angle θ at an output end.

The angle defined between the linear optical waveguide 12 and the bent nonlinear waveguide 14 is referred to as a branching angle. This branching angle is indicated by "θ" in FIG. 1.

The bent angle of the nonlinear waveguide 12, namely, the branching angle θ ranges from 3° to 10°.

On the other hand, the power of incident light coming into the linear waveguide structure is denoted by "$P_i$". The power of outgoing light from the output end of the linear waveguide is denoted by "$P_{lin}$" whereas the power of outgoing light from the output end of the nonlinear waveguide is denoted by "$P_{nl}$".

As mentioned above, the linear waveguide 12 is designed to have a straight structure which is not bent whereas the nonlinear waveguide 14 is designed to have a bent structure. This is because although light traveling along the bent linear waveguide 12 exhibits a high radiation loss at an area where the nonlinear waveguide 14 is bent, the nonlinear waveguide 14 generates a smaller radiation loss of light in spite of its bent structure.

In the case of the optical waveguide structure according to the present invention, the optical path of advancing light is actively determined as a function of the power of incident light. The principle of this determination will be described.

Where light with a power lower than a critical power enters the linear waveguide region of the Y-junction waveguide, it passes through the linear waveguide 12 because the refraction index of the nonlinear waveguide 14 is smaller than that of the linear waveguide 12.

However, where the incident light has a power higher than the critical power, its power is transmitted to the nonlinear waveguide region because the refraction index of the nonlinear waveguide 14 is larger than that of the linear waveguide 12 by virtue of the nonlinearity of the nonlinear waveguide 14. In this case, accordingly, the incident light, which is transmitted to the nonlinear waveguide region, travels along the bent nonlinear waveguide 14.

Thus, the travel path of light, namely, an optical signal is determined in accordance with the power of the optical signal without an external adjustment such as an adjustment by driving voltage. Therefore, the signal light $P_i$ can actively determine its travel path.

Figure 2:
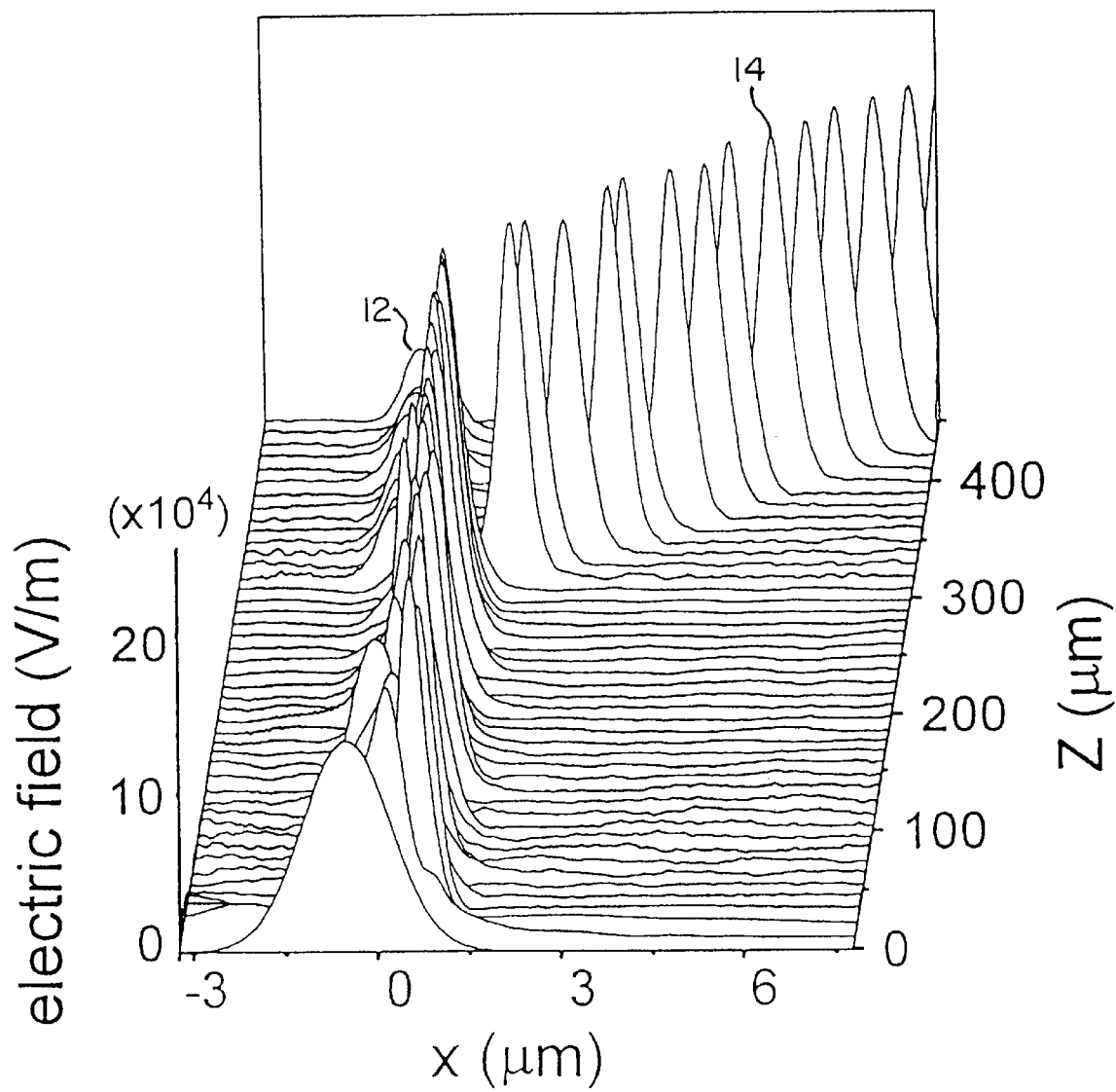
FIG. 2 is a graph depicting a field evolution with Gaussian beam excitation where the power of incident light is higher than the critical power.

FIG. 2 is a graph depicting the results of a computer simulation test for the waveguide traveling characteristic of nonlinear light where incident light having a Gaussian electric field distribution enters a linear waveguide region.

When the incident light having the Gaussian electric field distribution advances to 300 μm, its power is transmitted to the region of the nonlinear waveguide 14. The light transmitted to the region of the nonlinear waveguide 14 can travel efficiently along the nonlinear waveguide while generating a reduced radiation loss thereof.

Figure 3:
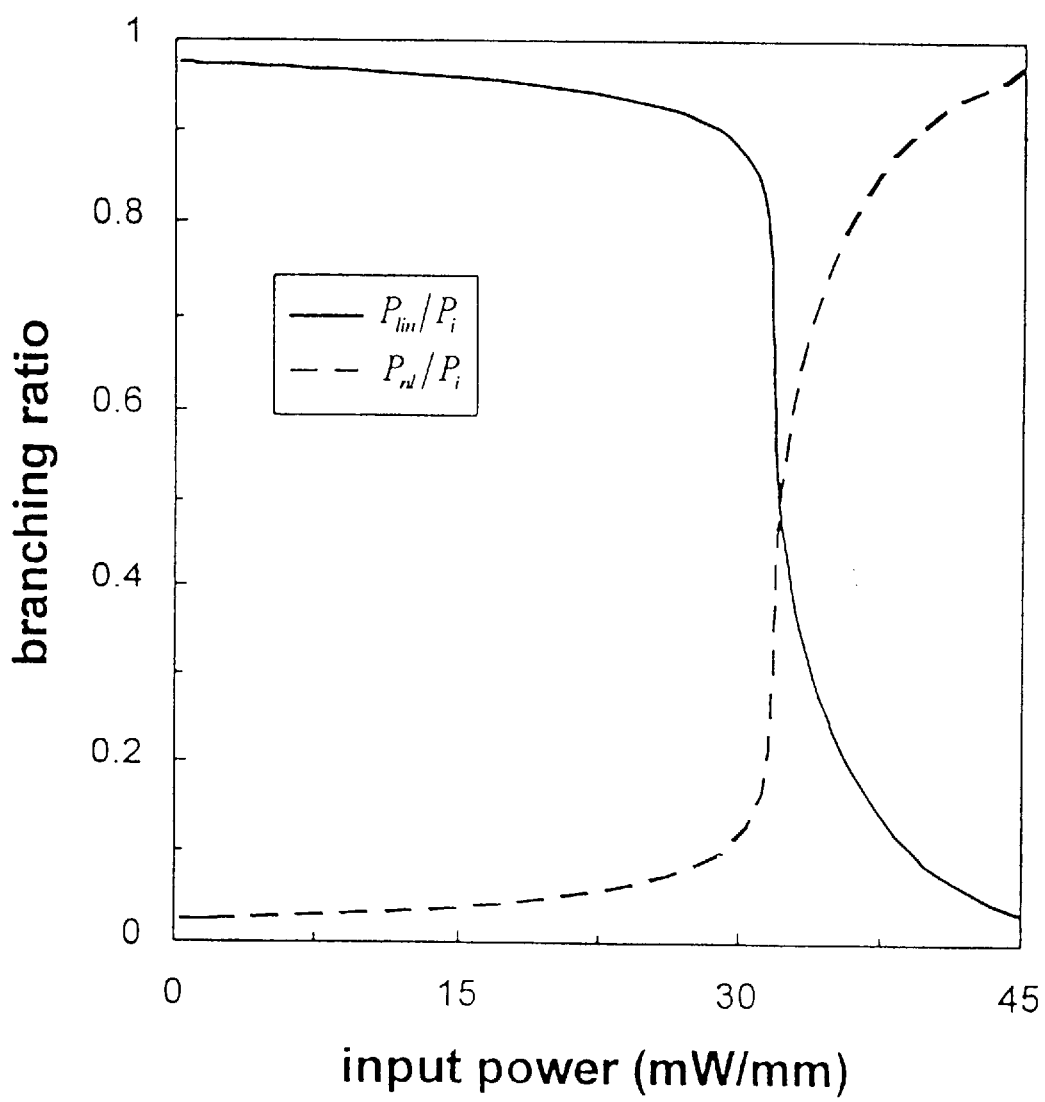
FIG. 3 is a graph depicting a variation in branching ratio depending on a variation in the power of incident light at a fixed branching angle.

FIG. 3 is a graph depicting a variation in the power characteristic of outgoing light depending on a variation in the power of incident light at a fixed branching angle of 3°.

In FIG. 3, the branching ratio $P_{lin}/P_i$ depicted by the solid line represents the ratio of the power of output light outgoing from the output end of the linear waveguide to the power of incident light. The branching ratio $P_{nl}/P_i$ depicted by the dotted line represents the ratio of the power of output light outgoing from the output end of the nonlinear waveguide to the power of incident light.

Where the power of incident light is lower than the critical power, most of the incident light travels while being trapped in the linear waveguide 12. When the light has a power higher than the critical power, most of its power is transmitted to the region of the nonlinear waveguide 14. Therefore, it can be understood that the nonlinear Y-junction waveguide structure of the present invention generates an abrupt switching phenomenon near the critical power.

Figure 4:
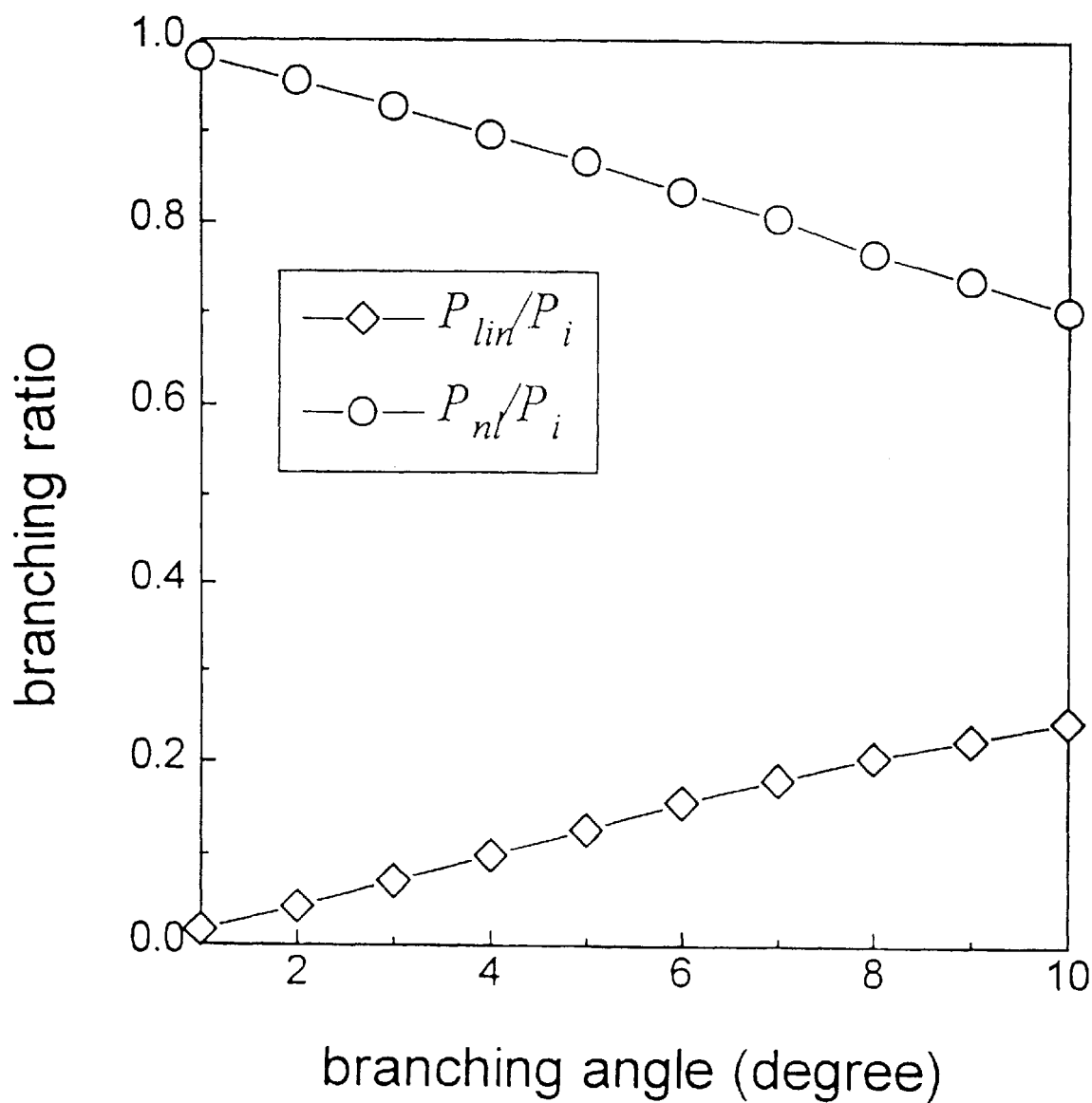
FIG. 4 is a graph depicting a variation in the branching ratio of output light depending on a variation in branching angle where the power of incident light is higher than the critical power.

FIG. 4 is a graph depicting a variation in the branching ratio of output light depending on a variation in branching angle where the power of incident light is higher than the critical power.

Referring to FIG. 4, it can be found that the branching ratio keeps a value of 70% or above until the branching angle reaches 10°. At a branching angle of 5°, a branching ratio of 85% is obtained. In the case of the zero-gap nonlinear directional coupler, the branching ratio of 85% is obtained at a branching angle of 1°. In this regard, it can be found that the structure of the present invention has an improvement in branching angle by five times as compared to the conventional structure.

As apparent from the above description, the present invention provides a nonlinear Y-junction waveguide structure which has an increased branching angle as compared to the conventional completely operating optical device and exhibits an abrupt switching phenomenon. Accordingly, it is possible to achieve an easy adjustment of the critical power. In this regard, there is no difficulty in the fabrication of the waveguide structure. Moreover, this enables a compactness of complete operating optical devices having an advantage in an ultra-high speed signal processing, thereby achieving an improvement in integration degree.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A nonlinear Y-junction waveguide structure which switches incident light between two outputs in dependence upon a power level of the incident light relative to a determined power level comprising:

a straight linear waveguide; and a nonlinear waveguide partially jointed to the linear waveguide and bent to a desired angle at an output end portion and wherein;

the incident light coming into the linear waveguide travels mainly along the linear waveguide when it has a power level lower than the determined power level and the incident light switches to travel mainly along the nonlinear waveguide when it has a power level equal to or greater than the determined power level.

2. A non linear Y-junction waveguide structure in accordance with claim 1 wherein:

the non-linear waveguide has a refraction index greater than a refraction index of the linear waveguide.

* * * * *